Jan. 20, 1953 W. G. COPP 2,625,966
MOTOR AND BELT DRIVE FOR TILT ARBOR SAWS
Filed June 1, 1951 5 Sheets-Sheet 3

INVENTOR
WILLIAM G. COPP
PER
Garrett E. Maybee
ATTORNEY.

Jan. 20, 1953 W. G. COPP 2,625,966
MOTOR AND BELT DRIVE FOR TILT ARBOR SAWS
Filed June 1, 1951 5 Sheets-Sheet 5
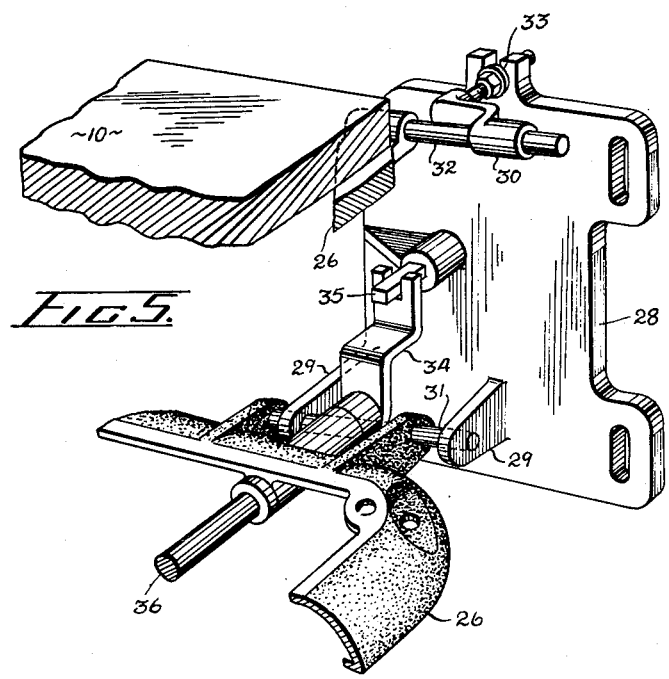
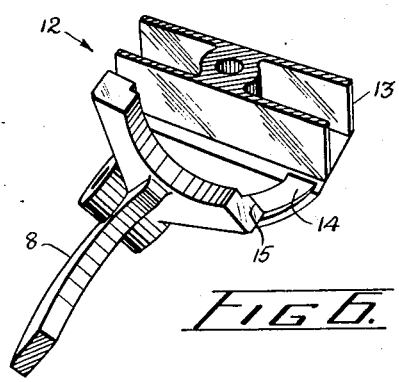
INVENTOR
WILLIAM G. COPP
PER
ATTORNEY Patented Jan. 20, 1953

2,625,966

UNITED STATES PATENT OFFICE 2,625,966

MOTOR AND BELT DRIVE FOR TILT ARBOR SAWS

William G. Copp, Guelph, Ontario, Canada, assignor to The Callender Foundry & Manufacturing Company, Limited, Guelph, Ontario, Canada, a corporation Application June 1, 1951, Serial No. 229,325

12 Claims. (Cl. 143—36)

This invention relates generally to power driven rotary tools and more particularly to machines of this type wherein the rotating element is held fast by a belt-driven mandrel or arbor and adjustable as regards its inclination to a frame or table from which it is supported.

The invention is particularly adaptable to circular saws of the tilting arbor type comprising a fixed table or work surface and an operating mechanism including a saw supported beneath it. The saw projects above the table through a suitable slot and may be tilted with respect to the table by pivoting the cradle which supports the saw arbor. Generally the cradle is supported by means of arcuate guides or trunnions fixed to the underside of the table so as to allow the cradle to pivot about a tilt axis lying horizontally in the plane of the table or work surface, and passing longitudinally through the center of the slot. This construction has the decided advantage that the line of intersection of the cutting plane of the saw with the table remains fixed no matter what the inclination of the saw, and the saw may be tilted without necessitating a readjustment of the ripping fence or other work guide. Such a construction is now utilized almost universally in tilting arbor saws. In addition, it is generally desirable to make provision for raising and lowering the saw, that is, for varying the extent to which it projects above the table or work surface. This may be done conveniently by mounting the saw arbor on a bracket which is hinged to the cradle in such fashion that it can pivot in the cutting plane. To summarize, the saw is tilted by pivoting the cradle about the axis of intersection of the cutting plane with the table, and it is raised or lowered by pivoting the arbor bracket with respect to the cradle about an axis normal to the cutting plane.

In connection with tilting arbor saws of the above type, the problem arises of how to mount the driving motor with respect to the saw. Up to the present time, commercially available saws have generally followed either one of two types of mounting constructions; the integral mount and the fixed mount.

In the integral type mount, the driving motor, which, it will be understood, is generally a fractional horsepower electric motor belt-connected to the saw, is secured to an extension of the cradle so that the saw and the motor pivot together when the saw is tilted. In some even more elaborate constructions, the motor is secured to a rearward extension of the arbor bracket, so that, in addition to tilting with the saw, it pivots with the arbor bracket whenever the saw is raised or lowered. Such constructions are excellent and eliminate completely the problem of twist and warp in the belt and of variation in tension. However they necessarily entail the provision of heavy rigid members for the cradle and tilting control linkages and cause the machine to be rather expensive.

In the fixed type mount, the motor is merely secured to the frame of the machine or otherwise suitably supported behind the saw and below the table or work surface. Such constructions are relatively inexpensive but they are subject to three disadvantages, in connection with the motor-to-saw linkage or belt, which will be referred to as twist, warp, and tension variation. Twist of the belt occurs when the motor pulley and the saw pulley rotate in planes intersecting along the axis of travel of the belt and is not of itself objectionable, especially when flexible belts of V-shaped cross-section are used. Warp of the belt occurs whenever the planes of rotation of the pulleys do not both include the axis of travel of the belt. For instance, warp exists whenever the pulleys, even though rotating in parallel planes, are laterally displaced one with respect to the other. It is the most objectionable of the three since it tends directly to make the belt jump off the pulleys. As for tension variation, it is caused by variation in the center-to-center distance of the motor and saw pulleys and is likewise objectionable since it may result either in slippage or in undue wear of the belt and of the motor and saw bearings.

It will be realized that all three of the above factors have to be considered whenever the saw is tilted. Twist of the belt occurs merely by reason of the fact that the saw pulley is inclined whereas the motor pulley is not. Warp of the belt occurs by reason of the fact that the saw pulley is pivoted about an axis considerably removed from its center. Thus whenever the saw is tilted, the saw pulley is subjected to both horizontal and vertical translations. The horizontal translation causes the warp referred to above. In addition, the vertical translation causes a shortening of the center-to-center distance of the saw and motor pulleys when the motor axis is below the saw axis, as is normally the case.

The general object of the present invention is to provide a new and improved motor mount in connection with a belt-driven tilting rotary machine tool, which insures efficient and trouble free operation without the heavy and expensive construction required in mounting the motor integrally with the tool.

A more specific object of the invention is to provide a relatively simple and inexpensive motor mount in connection with a tilting arbor saw which substantially eliminates warp and tension variation in the belt in the sense referred to above, consequent upon tilting of the saw.

Yet another object of the invention is to provide a new and improved tilting arbor saw construction comprising a hinged cradle supporting the saw arbor and a separately supported motor mount, and including a linkage mechanism insuring displacement of the motor consequent upon tilting of the saw, the displacement being such as substantially to eliminate warp and tension variation in the belt.

In accordance with the invention, the above objects are accomplished by securing the motor to a mount slidably supported on substantially horizontal guides at the rear of the saw frame. The guides are obliquely disposed in such fashion that when the motor is shifted laterally, it is simultaneously shifted rearwardly to a predetermined extent such that the center-to-center distance of the saw and motor pulleys remains substantially constant. Additionally there is provided an auxiliary linkage mechanism interconnected with the saw tilting mechanism which automatically effects the required shifting or lineal translation of the motor mount simultaneously with the tilting of the saw and which does not impose any torsional stress upon the saw cradle and its trunnions.

All of the foregoing and still further objects and advantages of the invention will become apparent from a study of the following specification, taken in conjunction with the accompanying drawings, wherein like characters of reference indicate corresponding parts throughout the several views and wherein:

Fig. 5 is a fragmentary perspective view of the motor mounting plate and of the immediately adjacent portions of the frame and illustrating the details of the horizontal guides for the mounting plate.

Fig. 6 is a perspective view of the rear arcuate guide or trunnion and of the adjacent portion of the cradle.

Figs. 1a, 2a, and 3a are co-ordinate diagrams illustrating certain geometric relations in connection with the main figures bearing like numerals.

Figure 1:
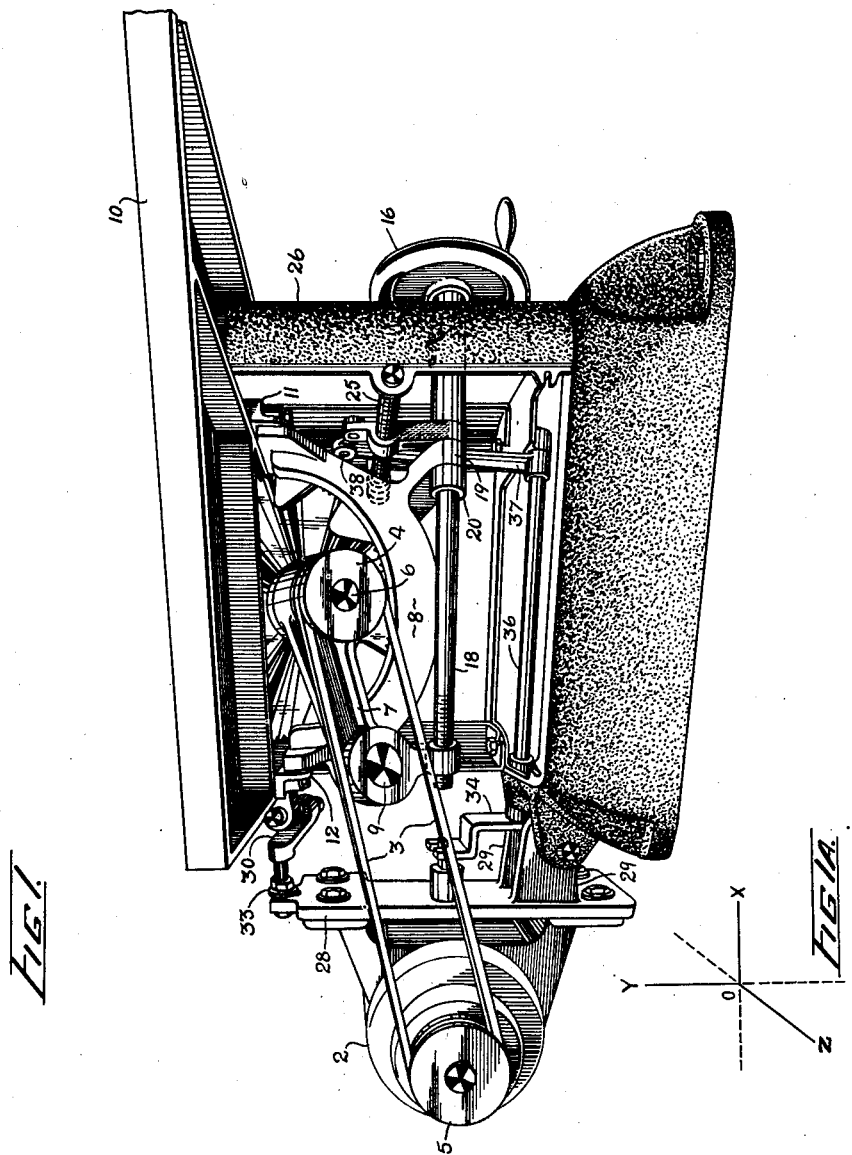
Fig. 1 is a perspective view of a tilting arbor saw construction (with cover plates removed) embodying the invention and illustrating particularly the linkage mechanism for effecting the required translation of the motor mount.

Referring to the drawings generally, and more particularly to Fig. 1, there is shown a rotary saw blade 1 (Fig. 2) driven by an electric motor 2 through a flexible belt 3 linking their respective pulleys 4 and 5. The saw and its pulley are fast to a mandrel or arbor 6 journalled at the forward extremity of a bracket 7, which bracket in turn is pivotally supported on a U-shaped cradle 8 by a transverse rock shaft 9. The cradle is pivotally hung beneath the table 10 by front and rear trunnion suspensions 11 and 12 respectively.

The rear trunnion suspension 12 may be seen more readily in Fig. 6. It comprises a trunnion bracket 13 which is secured to the underside of the table 10, and which has formed in its forward face an arcuate groove 14. The rear trunnion of the cradle 8 is provided with a projecting arcuate rib 15 adapted to slide within the groove of the bracket. The saw cradle is thus hung beneath the table yet is enabled to pivot about an axis lying on top of the table, the radius of curvature of the groove in the bracket and of the rib in the trunnion being chosen with this purpose in mind. While in the preferred embodiment of the invention described herein, the tilt axis of the saw lies precisely in the work surface, that is in the top of the table, it might under certain circumstances be desirable to locate it either slightly above or below the work surface and substantially parallel to it. The improved and simplified motor mount and linkage mechanism provided by the invention is equally applicable to such modified constructions.

Figure 2:
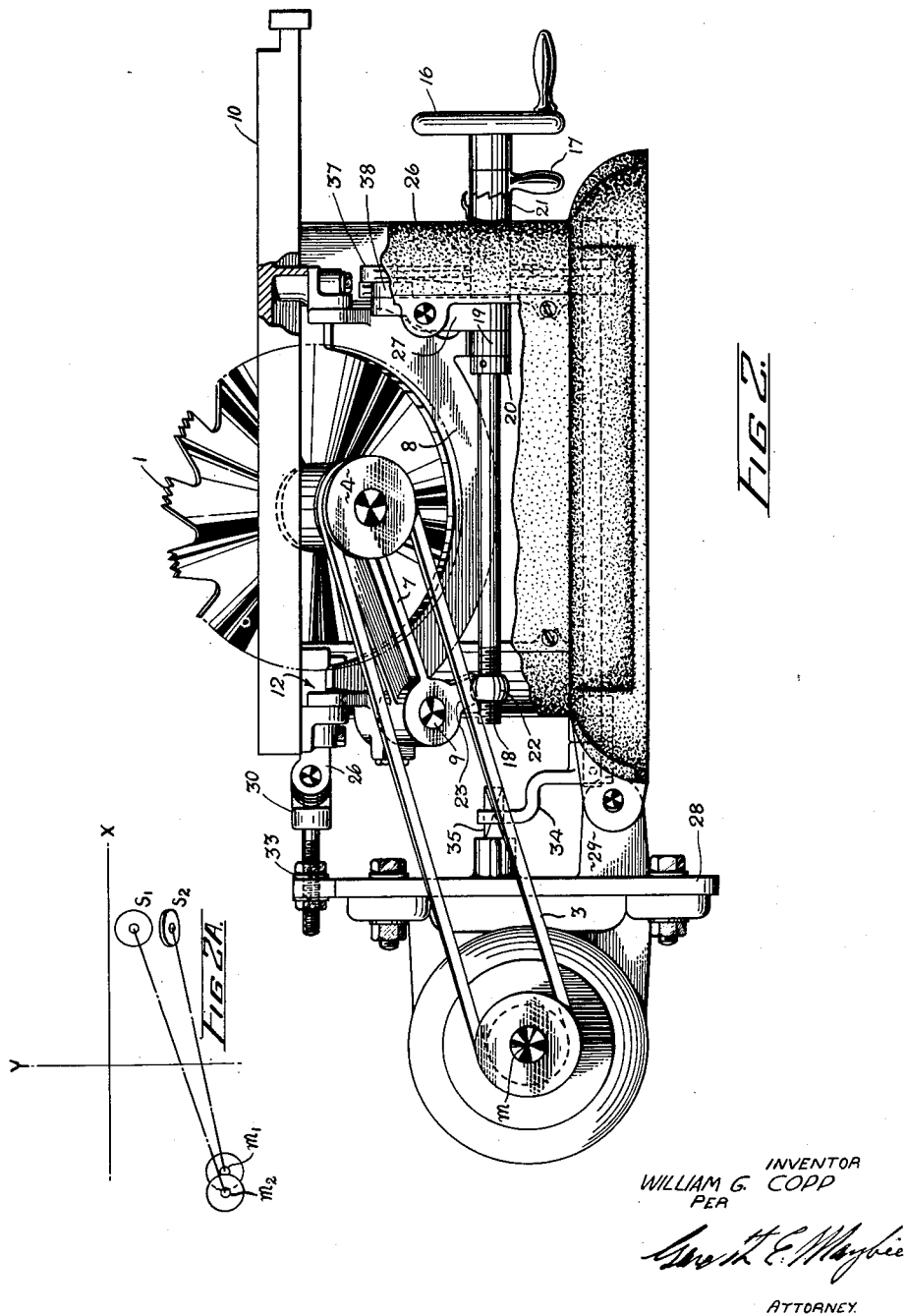
Fig. 2 is a broken away side elevational view of the saw construction, part of the table being cut away to illustrate more effectively the front arcuate guide or trunnion by which the cradle is supported.

Referring now to Fig. 2, it will be observed that the saw blade 1 can be raised or lowered with respect to the table 10 by pivoting the arbor bracket 7 about the rock shaft 9. Moreover the saw may be tilted by swinging the cradle 8 in its trunnion suspensions with respect to the table.

The saw blade is positioned as to elevation by means of an elevation handwheel 16 which may be locked in place by a cam lock 17. The elevation handwheel rotates a long screw 18 which is journalled on a projecting portion 19 of the cradle 8, and axially restrained thereon by the combination of screw set collar 20 and clamping sleeve 21 operating through the cam lock 17. The long screw 18 engages at its remote threaded end a threaded stud 22 causing it to translate and thereby causing the arbor bracket 7 to pivot by reason of the attachment of the stud to the bell crank portion 23 of the bracket.

Figure 3:
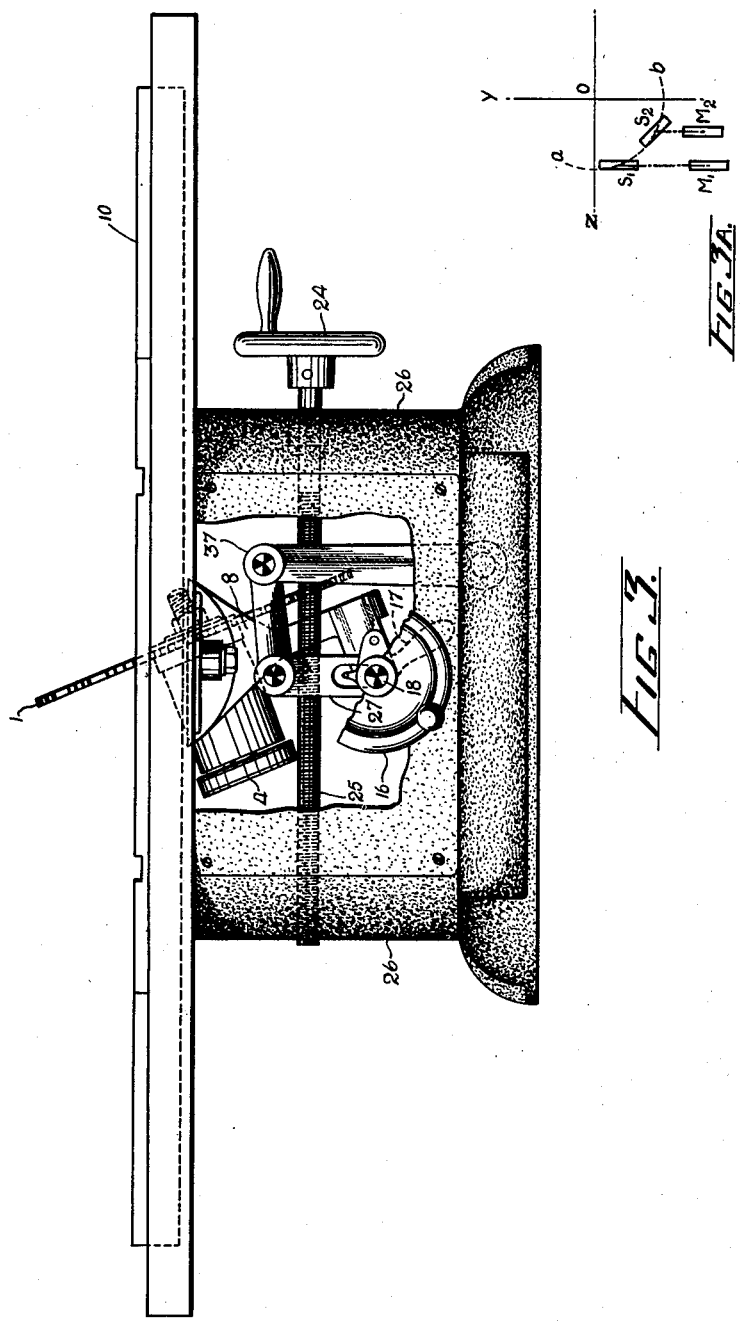
Fig. 3 is a front elevational view of the saw construction, part of a cover plate being cut away to show the control linkages for tilting the saw.

The inclination or tilt of the saw blade is controlled by means of a tilt handwheel 24 which rotates an axially fixed worm shaft 25 journalled at both ends in the frame 26 supporting the table 10, as may be seen more readily in Fig. 3. Shaft 25 engages a threaded cross-head 27 having a slot through which passes the long screw 18 which is journalled in the cradle 8. Rotation of shaft 25 will translate the cross-head 27 which in turn will traverse the long screw 18 and tilt the cradle 8 and the saw blade carried thereby. In an actual construction, the blade may be tilted to 45° off the vertical.

The invention more particularly relates to the means for mounting the driving motor and for causing it to translate in such fashion that warp and tension variations of the belt do not occur as a result of tilting the saw blade. The factors which have to be taken into consideration may be understood by reference to the coordinate diagrams 1a, 2a, and 3a. Diagram 1a merely co-relates the reference axes X, Y, and Z in relation to the mechanical construction illustrated in the drawings; the origin O is taken in the axis of intersection of the cutting plane with the table, that is, in the tilt axis, and immediately above the center of the saw blade. The positions of the center of the saw pulley are denoted in Figs. 2a and 3a by $s_1$ and $s_2$ for the saw blade in the vertical condition and in the 45 degree tilt conditions respectively; the corresponding positions of the center of the motor pulley are denoted by $m_1$ and $m_2$ respectively.

Referring to Fig. 3a, it will be seen that by reason of the fact that the saw cradle is hinged to pivot about the axis O, the saw pulley will travel along an arc $a$—$b$ whenever the saw is tilted. The exact location of this arc will vary somewhat with the elevation of the saw blade but the effect of this variation upon the factors considered here is small and may be disregarded. In shifting from the position $s_1$ to the position $s_2$, the saw pulley tilts through 45 degrees and moreover translates by predetermined distances to the right and downwardly. In order to prevent warp in the belt, the motor must translate an equal distance to the right, that is laterally from the position $m_1$ to the position $m_2$. It may also be desirable to provide a slight additional lateral translation to the motor in order to maintain the pulleys in alignment on the tension side of the belt. However, this is of lesser importance unless a relatively wide flat belt is used, as is well known in the art.

The effect of the translation downwards may be seen more readily by referring to Fig. 2a. Since the motor pulley is at a lower elevation than the saw pulley, the center-to-center distance of the two is reduced; accordingly the motor must move back, that is, to the left, in order that the distance $s_2$—$m_2$ be maintained equal to the original distance $s_1$—$m_1$. In other words when the saw blade is tilted in a counter-clockwise direction as shown in Fig. 3, the motor mount must be moved simultaneously to the right and back.

In accordance with the invention, the motor is enabled to translate by reason of its attachment to a vertical mounting plate 28 at the rear of the saw frame. The mounting plate is supported by the frame through brackets 29 and 30 which engage guides in the form of slide rods 31 and 32, as may best be seen in Fig. 5. The lower bracket 29 is constituted by a pair of arms which engage the slide rods 31 at spaced points in order to maintain the plate 28 vertical and prevent binding between the brackets and the rods. The upper bracket 30 is secured to the mounting plate by means of a threaded screw and locking nuts shown generally at 33, which permit some adjustment of the rearward tilt of the mounting plate for proper tensioning of the belt. The slide rods 31 and 32 are not parallel to the motor axis but are inclined rearwardly to the right, as may be seen in Fig. 4.

Figure 4:
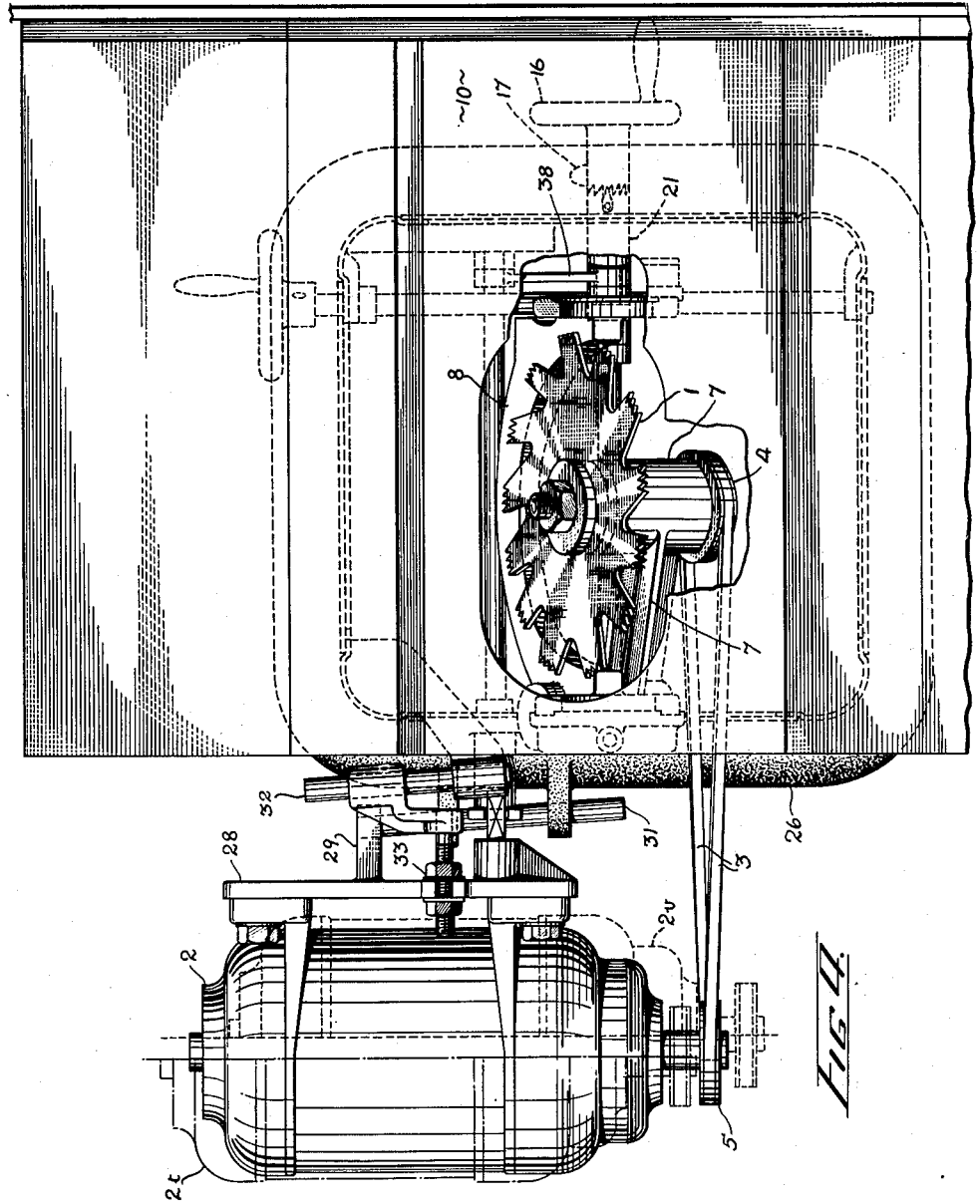
Fig. 4 is a top plan view with the throat plate removed and part of the table cut away to show details of construction. The motor is shown in dotted outline in two alternate positions corresponding to various inclinations of the saw.

The required translation of the motor is effected through the pivoting of a crank 34 which engages a stud 35 projecting forwardly from the mounting plate, as seen in Fig. 5. The crank 34 is keyed to a spindle 36 journalled in the frame, as seen in Fig. 1. The spindle rotates through a limited angle when the saw blade is tilted, the rotation being effected through a second crank 37 keyed to the spindle at one end, and connected to the threaded cross-head 27 through a link 38. It will be understood that the lengths of the cranks 34 and 37 are chosen to assure the required slideways or lateral translation of the motor with regard to the horizontal displacement of the saw pulley when the saw blade is tilted. As for the rearward translation of the motor, it is determined by the inclination or orientation of the slide rods 31 and 32 with respect to the frame. The dotted half outlines of the motor shown at $2v$ and $2t$ in Fig. 4 illustrate the positions occupied by the motor when the saw is vertical, in the first instance, and tilted at 45°, in the second instance.

From the above description of an embodiment of the invention, it is seen that the motor is supported by the frame and not by the cradle which may be of relatively light and inexpensive construction. By suitably displacing the motor slideways and rearwardly when the saw blade is tilted, the problem of warp and tension variation in the belt is substantially eliminated. Moreover, the displacement of the motor is effected through an auxiliary linkage separate from that which effects the tilt of the saw blade, although actuated through the same handwheel. This results in the elimination of torsional stress from the saw cradle and provides for a simple and economical construction thereof. Moreover the possibility of binding in the trunnions and trunnion brackets is eliminated and the whole mechanism operates smoothly and easily when tilting the saw.

While a specific embodiment has been shown and described, it will be understood that various modifications may be made within the scope of the invention. The invention is applicable to other types of belt-driven tilting rotary tools wherever like problems of warp and tension variation in the belt are encountered.

It will moreover be apparent that suitable modifications in the details of the mounting plate and of its translation control linkage may be made for taking care of variations in construction of the mechanism. The appended claims are therefore intended to cover any such modifications coming within the true spirit of the invention.

What I claim as my invention is:

1. A machine tool construction comprising a frame structure defining a plane work surface, a cradle pivotally supported beneath the work surface about a tilt axis lying substantially parallel to and close to the work surface, a journal portion in the cradle, an arbor journalled in said portion and adapted to carry a tool for rotation in a cutting plane containing the tilt axis and intersecting the work surface, a pulley non-rotatably mounted on the arbor, control means for pivoting the cradle, a mounting plate for attachment thereto of a motor equipped with a pulley effecting a belt drive of the arbor pulley, guides slidably supporting the mounting plate behind the frame and below the work surface, the said guides being obliquely arranged to provide for a rearward translation of the plate simultaneously with lateral translation thereof, and an auxiliary linkage directly connected between the control means and the plate for effecting lineal translation of the plate on the guides when the arbor is tilted.

2. In a machine tool, a frame structure defining a plane work surface, a cradle pivotally supported beneath the work surface about a tilt axis lying substantially parallel to and close to the work surface, a journal portion in the cradle, an arbor journalled in said portion, a tool mounted on the arbor for rotation in a cutting plane containing the tilt axis and intersecting the work surface, a pulley non-rotatably mounted on the arbor, control means for pivoting the cradle, a mounting plate, a motor mounted thereon and having a pulley non-rotatably mounted on its shaft, a flexible belt linking the pulleys, guides slidably supporting the mounting plate behind the frame and below the work surface, the said guides being obliquely arranged to provide for a rearward translation of the plate simultaneously with lateral translation thereof, and an auxiliary linkage directly connected between the control means and the plate for effecting lineal translation of the plate on the guides when the arbor is tilted, thereby to shift the motor and prevent the occurrence of warp and tension variation in the belt.

3. A machine tool construction comprising a frame structure defining a plane work surface, a cradle pivotally supported beneath the work surface about a tilt axis lying therein, a journal portion in the cradle, an arbor journalled in said portion and adapted to carry a tool for rotation in a cutting plane intersecting the work surface along the said tilt axis, a pulley non-rotatably mounted on the arbor, control means for pivoting the cradle, a mounting plate for attachment thereto of a motor equipped with a pulley for effecting a belt drive of the arbor pulley, guides slidably supporting the mounting plate behind the frame and below the work surface, the said guides being obliquely arranged to provide for a rearward translation of the mounting plate simultaneously with lateral translation thereof, and an auxiliary linkage for effecting translation of the plate when the arbor is tilted, the said auxiliary linkage comprising a spindle journalled in the frame, a crank secured at one end of the spindle and engaging a portion of the plate, and means directly linking the spindle to the control means in a manner to cause limited rotation of the spindle when the control means is operated to tilt the arbor.

4. In a machine tool, a frame structure defining a plane work surface, a cradle pivotally supported beneath the work surface about a tilt axis lying substantially parallel to and close to the work surface, a journal portion in the cradle, an arbor journalled in said portion, a tool mounted on the arbor for rotation in a cutting plane containing the tilt axis and intersecting the work surface, a pulley non-rotatably mounted on the arbor, control means for pivoting the cradle, a mounting plate, a motor mounted thereon and having a pulley non-rotatably mounted on its shaft, a flexible belt linking the pulleys together, guides slidably supporting the mounting plate behind the frame and below the work surface, the said guides being oriented to allow a rearward translation of the plate simultaneously with lateral translation thereof, and an auxiliary linkage for effecting translation of the plate when the arbor is tilted, the said auxiliary linkage comprising a spindle journalled in the frame, a crank secured at one end of the spindle and engaging a portion of the plate, and means directly linking the spindle to the control means in a manner to cause rotation of the spindle when the control means is operated to tilt the arbor, thereby to slide the plate and motor in order to minimize warp and tension variations in the belt when the arbor is tilted.

5. A machine tool construction comprising a frame structure defining a plane work surface, a cradle pivotally supported beneath the work surface about a tilt axis lying substantially parallel to and close to the work surface, a journal portion in the cradle, an arbor journalled in said portion and adapted to carry a tool for rotation in a cutting plane containing the tilt axis and intersecting the work surface, a pulley non-rotatably mounted on the arbor, control means for pivoting the cradle in order to vary the tilt of the arbor, the said control means comprising a rotatable worm shaft journalled in the frame and a threaded cross-head mounted for translation on the worm shaft and engaging a portion of the cradle, a mounting plate for attachment thereto of a motor equipped with a pulley for effecting a belt drive of the arbor pulley, guides slidably supporting the mounting plate behind the frame and below the work surface, the said guides being obliquely arranged to provide for a rearward translation of the plate simultaneously with lateral translation thereof, and an auxiliary linkage directly connecting the plate to the threaded cross-head for effecting lineal translation of the plate on the guides when the arbor is tilted.

6. A machine tool construction comprising a frame structure defining a plane work surface, a cradle pivotally supported beneath the work surface about a tilt axis lying therein, a journal portion in the cradle, an arbor journalled in said portion and adapted to carry a tool for rotation in a cutting plane intersecting the work surface along the said tilt axis, a pulley non-rotatably mounted on the arbor, control means for pivoting the cradle in order to vary the tilt of the arbor, the said control means comprising a rotatable worm shaft journalled in the frame and a threaded cross-head mounted for translation on the worm shaft and engaging a portion of the cradle, a mounting plate for attachment thereto of a motor equipped with a pulley for effecting a belt drive of the arbor pulley, guides slidably supporting the mounting plate behind the frame and below the work surface, the said guides being obliquely arranged to provide for a rearward translation of the plate simultaneously with lateral translation thereof, and an auxiliary linkage for effecting translation of the plate when the arbor is tilted, the said linkage comprising a rotatable spindle journalled in the frame and carrying a crank at each end, one of the cranks engaging a portion of the plate and the other crank engaging a portion of the threaded cross-head.

7. A machine tool construction comprising a frame structure defining a plane work surface, a cradle pivotally supported beneath the work surface about a tilt axis lying therein, a journal portion in the cradle, an arbor journalled in said portion and adapted to carry a tool for rotation in a cutting plane intersecting the work surface along the said tilt axis, a pulley non-rotatably mounted on the arbor, control means for pivoting the cradle in order to vary the tilt of the arbor, the said control means comprising a rotatable worm shaft journalled in the frame substantially transversely to the tilt axis and a threaded cross-head mounted for translation on the worm shaft and engaging a portion of the cradle, a mounting plate for attachment thereto of a motor equipped with a pulley for effecting a belt drive of the arbor pulley, guides slidably supporting the mounting plate behind the frame and below the work surface, the said guides being obliquely arranged to provide for a rearward translation of the plate simultaneously with lateral translation thereof, and an auxiliary linkage for effecting translation of the plate when the arbor is tilted, the said linkage comprising a spindle journalled on the frame substantially parallel to the tilt axis, a crank secured to each end of the spindle, one of the cranks engaging the threaded cross-head for causing a limited rotation of the spindle when the worm shaft is rotated, and the other crank engaging a portion of the plate for effecting a predetermined translation thereof in synchronism with the tilting of the arbor.

8. A machine tool construction comprising a frame structure defining a plane work surface, a cradle pivotally supported beneath the work surface about a tilt axis lying therein, a rock shaft mounted on the cradle with its axis transverse to the said tilt axis, an arbor bracket pivotally mounted on the rock shaft, an arbor bearing in the bracket, an arbor journalled in said bearing and adapted to carry a tool for rotation in a cutting plane intersecting the work surface along the said tilt axis, a pulley non-rotatably mounted on the arbor, means for pivoting the arbor bracket in order to vary the elevation of the arbor, control means for pivoting the cradle in order to vary the tilt of the arbor, the said control means comprising a rotatable worm shaft journalled in the frame substantially transversely to the tilt axis and a threaded cross-head mounted for translation on the worm shaft and engaging a portion of the cradle, a mounting plate for attachment thereto of a motor equipped with a pulley for effecting a belt drive of the arbor pulley, guides slidably supporting the mounting plate behind the frame and below the work surface, the said guides being obliquely arranged to provide for a rearward translation of the plate simultaneously with lateral translation thereof, and an auxiliary linkage comprising a spindle journalled on the frame substantially parallel to the tilt axis, a crank secured to each end of the spindle, one of the cranks engaging the threaded cross-head for causing a limited rotation of the spindle when the worm shaft is rotated, and the other crank engaging a portion of the plate for effecting a predetermined translation thereof.

9. A tilting arbor machine tool construction comprising a frame structure defining a plane work surface, a generally U-shaped cradle, a pair of trunnions at opposite ends of the cradle and cooperating trunnion brackets secured to the frame structure for allowing the cradle to pivot about a tilt axis lying in the work surface, a journal portion in the cradle, a tool arbor journalled in said portion for rotation about an axis substantially transverse to the tilt axis, control means for adjusting the tilt of the arbor comprising a worm shaft journalled in the frame transversely to the tilt axis and a threaded cross-head riding on the worm shaft and engaging a projecting portion of the cradle, rotation of the worm shaft causing translation of the cross-head and tilting of the cradle, a motor mounting plate, slide rods supporting the plate in a vertical position behind the frame and below the work surface, the said rods being oriented to allow a rearward translation of the plate simultaneously with lateral translation thereof, a motor mounted on the plate with its shaft substantially transverse to the tilt axis, belt drive means between the motor and the arbor, and an auxiliary linkage comprising a forwardly projecting stud on the plate, a rotatable spindle journalled in the frame substantially parallel to the tilt axis, and a pair of cranks secured to the spindle, one of the cranks engaging the stud and the other crank being linked to the threaded cross-head, thereby to effect translation of the plate when the arbor is tilted.

10. A tilting arbor machine tool construction comprising a frame structure defining a plane work surface, a generally U-shaped cradle, a pair of trunnions at opposite ends of the cradle and cooperating trunnion brackets secured to the frame structure for allowing the cradle to pivot about a tilt axis lying in the work surface, a journal portion in the cradle, a tool arbor journalled in said portion for rotation about an axis substantially transverse to the tilt axis, control means for adjusting the tilt of the arbor comprising a worm shaft journalled in the frame transversely to the tilt axis, and a threaded cross-head riding on the worm shaft and engaging a projecting portion of the cradle, rotation of the worm shaft causing translation of the cross-head and tilting of the cradle, a motor mounting plate, slide rods supporting the plate in a vertical position behind the frame and below the work surface, the said rods being oriented to allow a rearward translation of the plate simultaneously with lateral translation thereof, a motor mounted on the plate with its shaft substantially transverse to the tilt axis, belt drive means between the motor and the arbor, and an auxiliary linkage comprising a forwardly projecting stud on the plate, a rotatable spindle journalled in the frame substantially parallel to the tilt axis, a pair of cranks secured to the spindle, and a link between one of the cranks and the threaded cross-head, thereby to effect a limited rotation of the spindle when the worm shaft is rotated, the other of said cranks being disposed to engage the stud, thereby to effect a predetermined translation of the plate and motor mounted thereon in synchronism with the tilting of the cradle and arbor.

11. A tilting arbor machine tool construction comprising a frame structure supporting a horizontal table, a generally U-shaped cradle, a pair of trunnions at opposite ends of the cradle and cooperating trunnion brackets secured to the table for allowing the cradle to pivot about a tilt axis lying on the table, a journal portion in the cradle, a tool arbor journalled in said portion for rotation about an axis substantially transverse to the tilt axis, control means for adjusting the tilt of the arbor comprising a worm shaft journalled in the frame transversely to the tilt axis, and a threaded cross-head riding on the worm shaft and engaging a projecting portion of the cradle, rotation of the worm shaft causing translation of the cross-head and tilting of the cradle, a motor mounting plate, a pair of horizontal slide rods supporting the plate near its top and bottom in a vertical position behind the frame and below the table, the said rods being oriented to allow a rearward translation of the plate simultaneously with lateral translation thereof, a motor mounted on the plate with its shaft substantially parallel to and below the arbor, belt drive means between the motor and the arbor, and an auxiliary linkage comprising a forwardly projecting stud on the plate, a rotatable spindle journalled in the frame substantially parallel to the tilt axis, and a pair of cranks secured to the spindle, one of the cranks engaging the stud, and a pivoted link connecting the other of said cranks to the cross-head thereby to effect a predetermined translation of the mounting plate and motor mounted thereon when the arbor is tilted.

12. A tilting arbor circular saw construction comprising a frame structure, a horizontal table supported thereon, a generally U-shaped cradle, a pair of arcuate trunnions at opposite ends of the cradle and cooperating trunnion brackets secured to the underside of the table for allowing the cradle to pivot about a tilt axis lying on the table, a rock shaft mounted on the cradle with its axis transverse to the said tilt axis, an arbor bracket pivotally mounted on the rock shaft, an arbor bearing in the bracket, an arbor journalled in said bearing, a circular saw fastened to the arbor for rotation in a cutting plane intersecting the surface of the table along the said tilt axis, a pulley non-rotatably mounted on the arbor, means for pivoting the arbor bracket for varying the elevation of the saw, control means for adjusting the tilt of the saw comprising a worm shaft journalled in the frame transversely to the tilt axis, and a threaded cross-head riding on the worm shaft and engaging a projecting portion of the cradle, a motor mounting plate, a pair of horizontal slide rods fastened to the frame and supporting the plate near its top and bottom in a vertical position behind the frame and below the table, the said rods being oriented with respect to the frame to allow a rearward translation of the plate simultaneously with lateral translation thereof, a motor mounted on the plate with its shaft substantially transverse to the tilt axis and having a pulley non-rotatably mounted thereon, the said motor shaft being lower in elevation than the arbor, a flexible belt linking the arbor pulley and the motor pulley, and an auxiliary linkage comprising a forwardly projecting stud on the plate, a rotatable spindle journalled in the frame substantially parallel to the tilt axis, a pair of cranks secured to the spindle, one of the cranks engaging the stud, and a pivoted link connecting the other crank to the cross-head, thereby to effect a predetermined translation of the plate and motor mounted thereon when the cradle and arbor are tilted.

WILLIAM G. COPP.

REFERENCES CITED

The following references are of record in the file of this patent:

UNITED STATES PATENTS

| Number | Name | Date |
|---|---|---|
| 2,121,069 | Collins | June 21, 1938 |
| 2,168,282 | Tautz | Aug. 1, 1939 |
| 2,407,028 | McLean | Sept. 3, 1946 |
| 2,480,893 | Whittle | Sept. 6, 1949 |